FIG. I
PRIOR ART

Feb. 9, 1971 A. BORGANTI 3,561,167
MACHINE FOR LAPPING ELEMENTS OBTAINED FROM CRYSTALLINE
MATERIALS, AND PARTICULARLY SEMICONDUCTOR CRYSTALS
Filed July 29, 1968 5 Sheets-Sheet 2

INVENTOR
AUGUSTO BORGANTI

BY Stevens, Davis, Miller & Mosher
ATTORNEYS

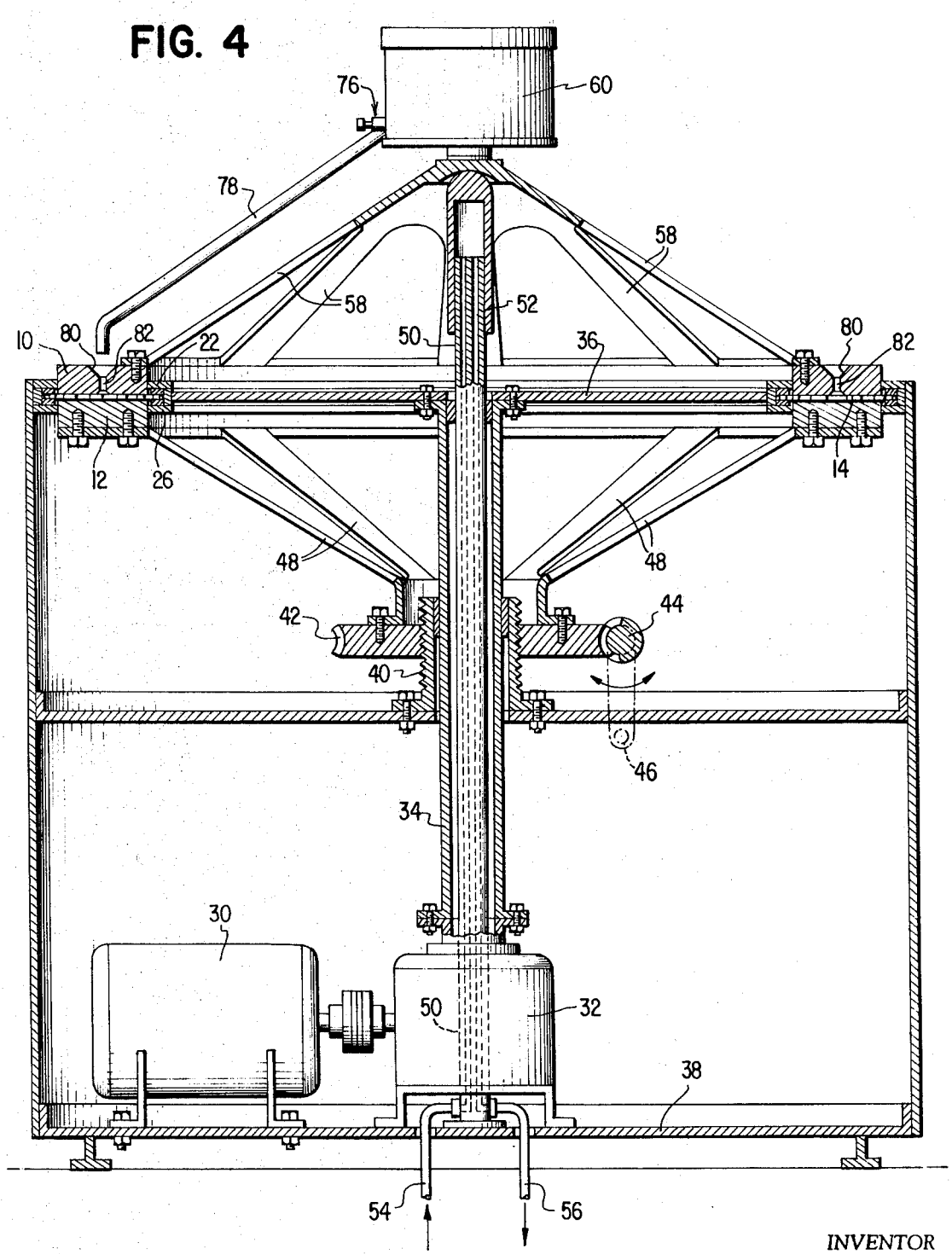

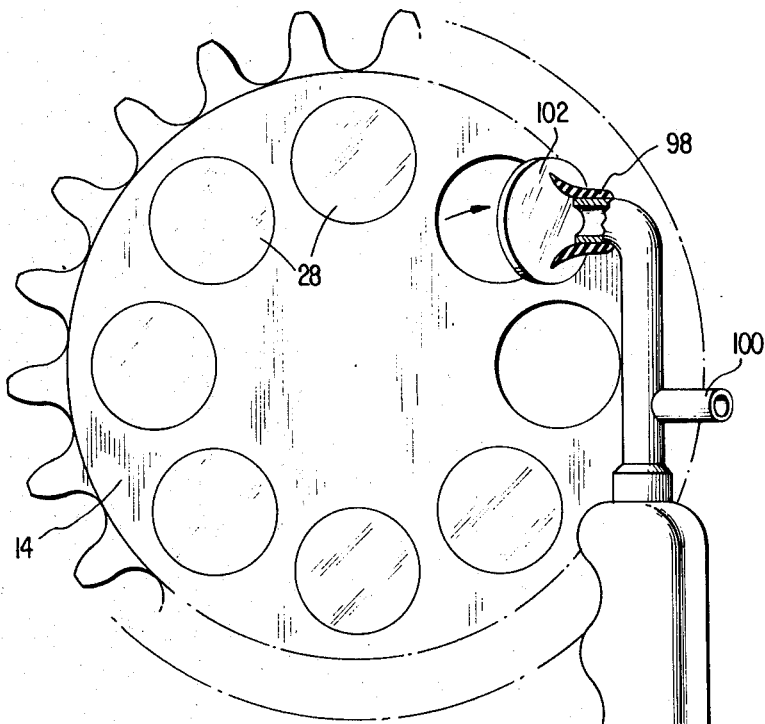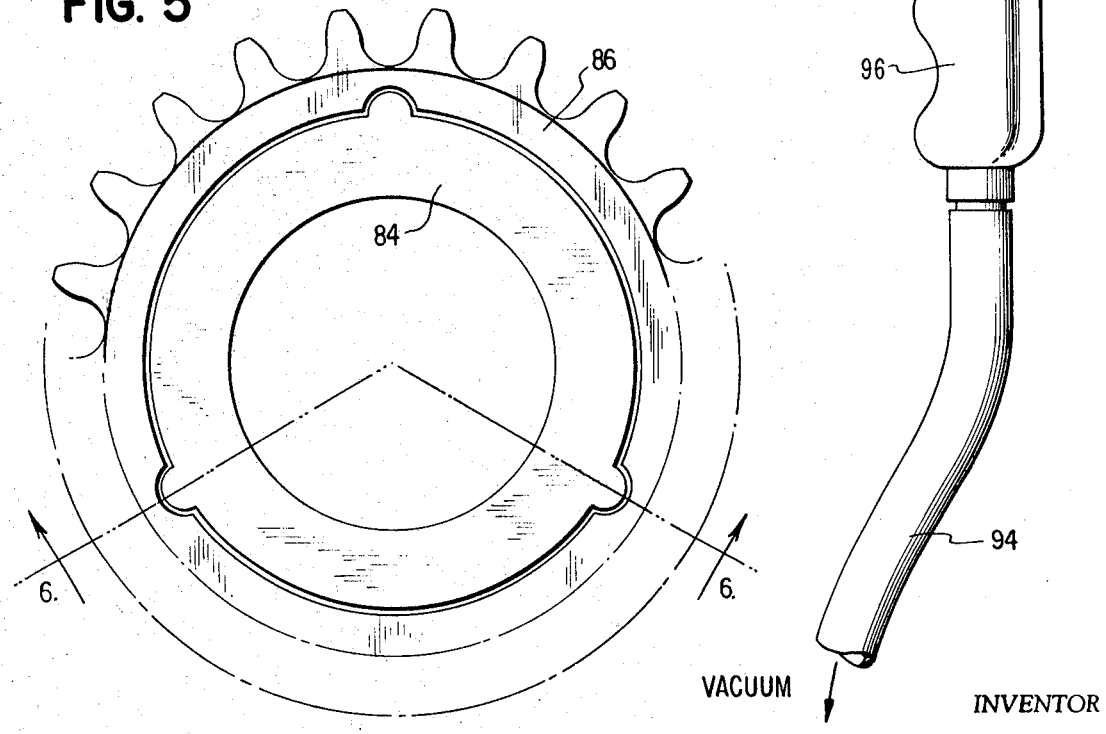

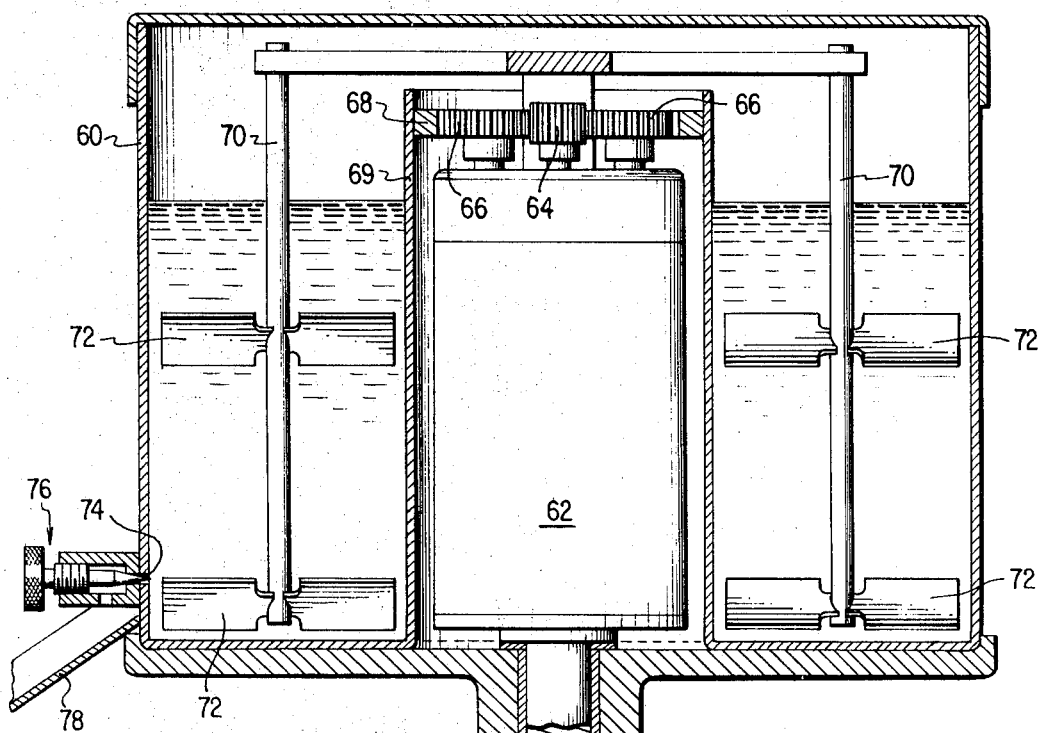
FIG. 9
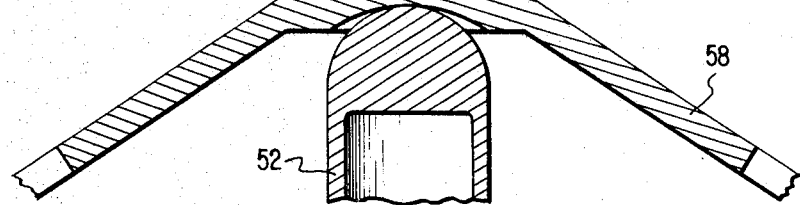
FIG. 6
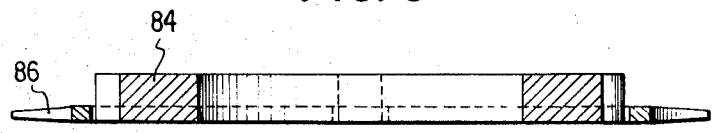
INVENTOR
AUGUSTO BORGANTI
BY *Stevens, Davis, Miller & Mosher.*
ATTORNEYS.

United States Patent Office 3,561,167
Patented Feb. 9, 1971

3,561,167
MACHINE FOR LAPPING ELEMENTS OBTAINED FROM CRYSTALLINE MATERIALS, AND PARTICULARLY SEMICONDUCTOR CRYSTALS
Augusto Borganti, Merano, Bolzano, Italy, assignor to Montecatini Edison S.p.A., Milan, Italy, a corporation of Italy
Filed July 29, 1968, Ser. No. 748,566
Claims priority, application Italy, Aug. 2, 1967, 19,147/67
Int. Cl. B24b 5/18
U.S. Cl. 51—161
8 Claims

ABSTRACT OF THE DISCLOSURE

A novel machine for lapping elements obtained from crystalline materials, and particularly semiconductor crystals, is provided which represents a substantial modification of a broadly known type of machine for that purpose employing planetary gears revolving between a central sun gear and an outer ring gear with the elements to be lapped disposed in recesses in the planetary gears between annular lapping plates, the improvement of the present invention comprising the use of a roller or Galle's type chain to actuate the planetary gears instead of the sun and ring gears. In addition, means are provided for maintaining any desired separation of the annular lapping plates between which the planetary gears are disposed, and also a suction cup device for readily removing the finished lapped elements from their recesses in the planetary gears without scoring or damaging the delicate finish on the lapped surfaces of the lapped elements.

---

The present invention relates to a novel machine for lapping discs and prisms obtained from crystalline-structured brittle materials, and particularly crystals of semiconductor substances, quartz and the like, until flat and parallel surfaces are obtained.

It is well known in that art that in the conventional lapping machines the elements to be lapped are caused to slide between two annular cast iron plates by a set of planetary gears which act both as holders for the elements to be lapped and as drive elements. A liquid lapping mixture containing suspended abrasive is interposed between the two cast iron plates. The planetary gears rotate on their own centers while at the same time revolving about the center or axis of the annular cast iron lapping plates. The elements to be lapped consequently follow an epicyclic path in the machine.

In those conventional lapping machines, two driving crown gears, one a ring gear and the other a sun gear, are disposed centrally and peripherally with respect to the lapping plates and supply the meshing planetary gears with rotational movement. These crown gears rotate at different angular velocities so that both of the above described motions are imparted to the planetary gears, i.e., rotation about their own centers and rotation about the center or axis of the annular lapping plates.

In some cases also the annular lapping plates are made to rotate.

In some known types of machines, instead of gear teeth the driving crown gears are provided with a crown of pins interspaced at the same pitch as that of the teeth of the planetary gears and meshing with them.

Both of the foregoing arrangements present certain disadvantages. Thus, in the case of ordinary crown gears it is necessary to arrange for their replacement at considerable cost when the planetary gears with which they mesh scores or wear the teeth. On the other hand, in the case of crowns provided with pins which are very numerous, the replacement of the pins when worn involves an inordinate waste of time and expense.

Consequently, the main object of the present invention is to provide a machine combining a high productive capacity, and for the finished prodlucts, a high accuracy of the obtainable dimensions and a high degree of finish.

Another object of this invention is to provide a machine combining the foregoing features with the semi-automaticity of the production cycle involving ascertaining and rectifying the thickness of the workpieces during processing.

These and other objects are attained by the machine according to the present invention, which uses instead of a central crown driving gear and a peripheral crown gear, a common roller or Galle's type chain, contained in suitable seats, thus providing an arrangement that is simpler and remarkably less expensive than previously known arrangements involving the use of crown gears, and moreover one that is more quickly replaceable than previously known arrangements involving crowns provided with pins.

Furthermore, in the machine built according to the present invention only the central crown rotates about its axis and transmits its rotation to the planetary gears, and consequently the movement of the elements to be lapped is therefore hypocyclic.

The planetary gears, as is well known, by their regular running wear the crowns on the surfaces where the planetary gears and crowns mesh or engage each other. When the crowns become scored to a degree such as to hamper their regular working, the vertical position of the annular lapping plates is, according to the present invention, varied, thus letting a new or fresh crown surface function.

The conventional machines achieve the same result by displacing the crowns instead of the lapping plates, which however is an undesirable complication from the constructional standpoint, as it is necessary to act on machine elements having a rotational movement.

These and other features of the novel machine according to the present invention will become still more apparent by reference to the accompanying drawings, wherein:

FIG. 4 shows schematically the entire machine according to this invention;

FIG. 5 shows a top view of an abrasive ring as well as the juxtaposed crown gear which is adapted to slide on the abrasive ring;

FIG. 6 is a vertical section along the line 6—6 of FIG. 5;

FIG. 8 shows schematically a device for lifting and removing in an extremely quick and safe way the lapped elements from the dragging seats of the planetary gears where they are disposed during the lapping operation; and FIG. 9 shows the arrangement for the distribution of the abrasive lapping mixture between the two lapping plates.

Figure 1:
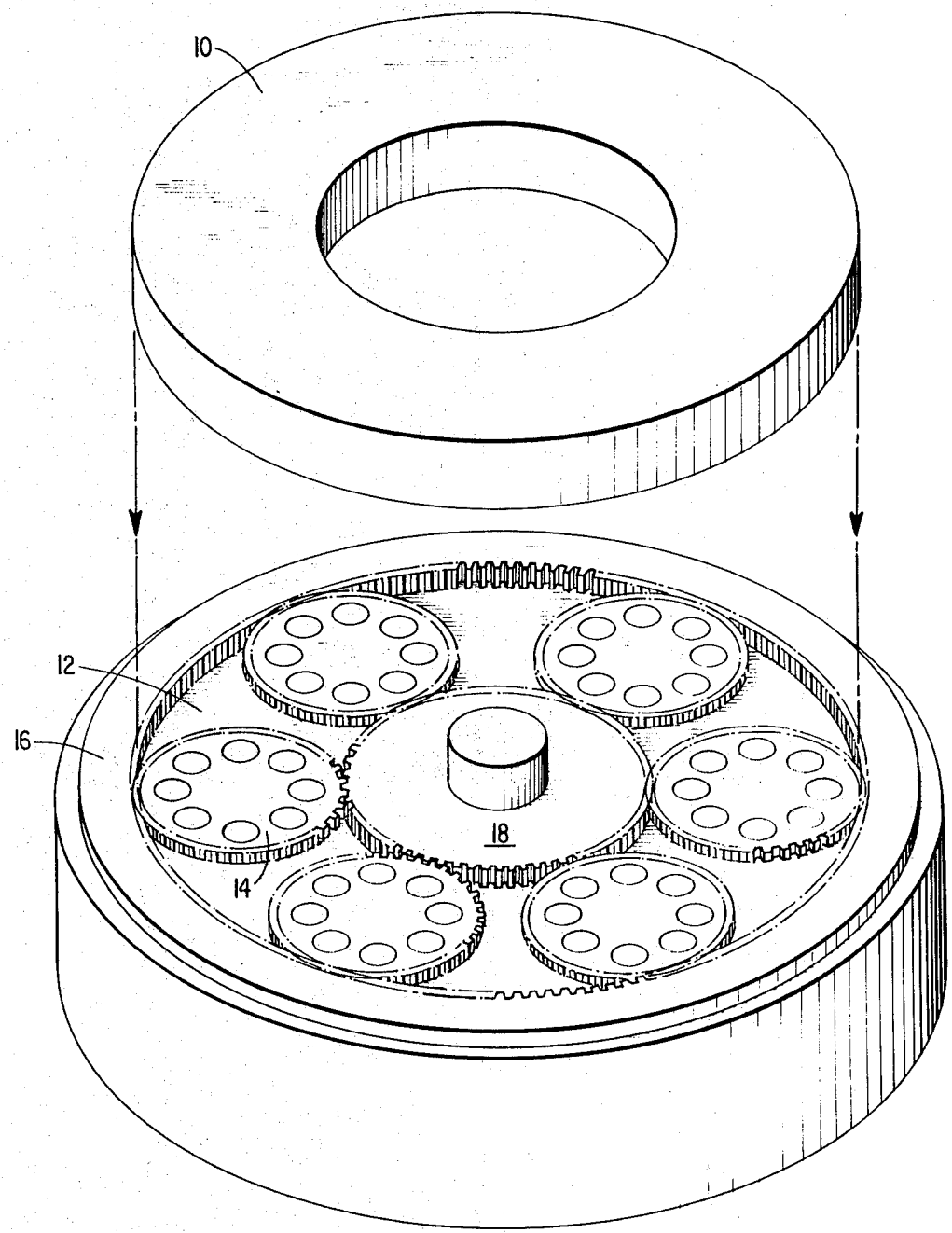
FIG. 1 shows schematically a perspective view of a conventional type lapping machine.

In FIG. 1, illustrating a known system, the elements to be lapped are placed in such a manner that they slide between two cast iron annular plates 10 and 12 by means of a set of planetary gears 14 which act both as holders for the elements to be lapped and as drive members.

The ring gear 16 and the sun gear 18, placed peripherally and centrally, respectively, with respect to the lapping plates 10 and 12 impart the desired rotational movement to the planetary gears 14.

The gears 16 and 18 rotate at different angular velocities so that the planetary gears 14 receive two kinds of rotational movement: about their own centers and about the center or axis of the lapping machine. Consequently, the elements to be lapped follow an epicyclic movement.

Figure 2:
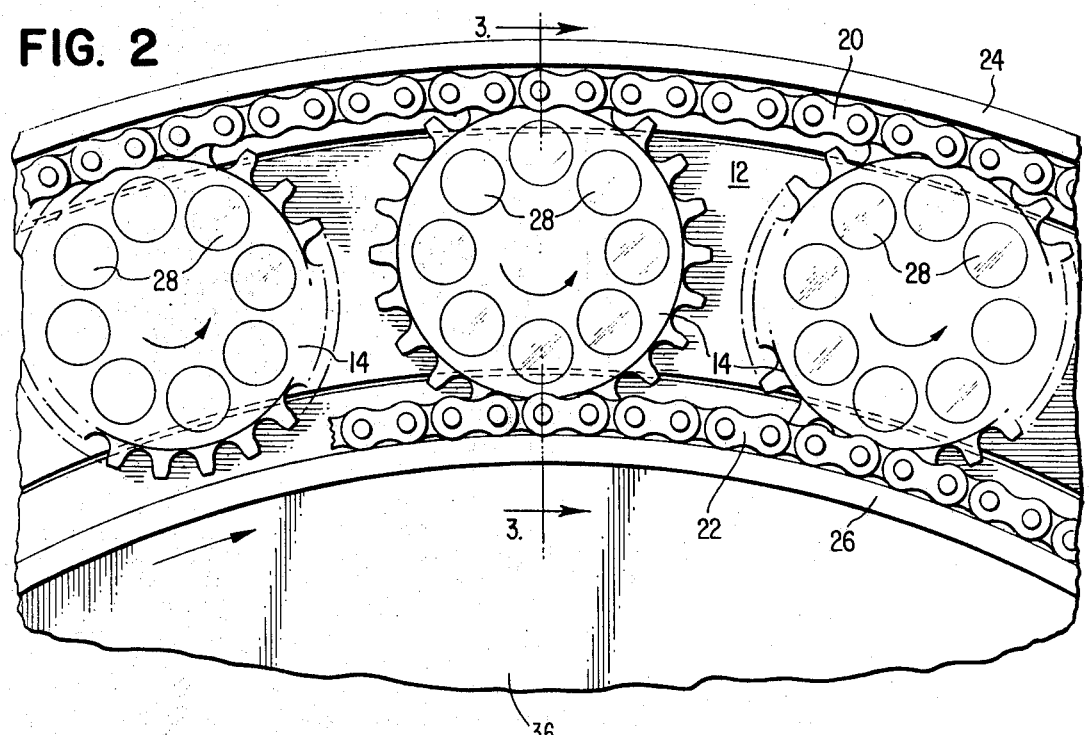
FIG. 2 shows a horizontal part section of the main elements of the machine according to the present invention.
Figure 3:
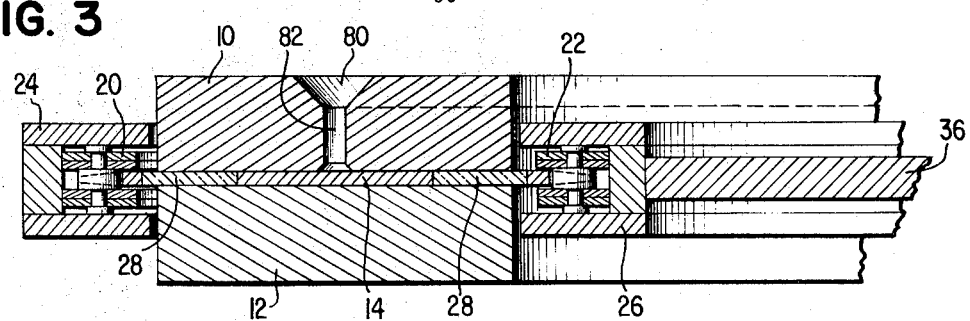
FIG. 3 is a vertical section along the line 3—3 of FIG. 2.

FIGS. 2 and 3 illustrate the main elements of this invention, namely the upper annular lapping plate 10, the lower plate 12, the peripheral roller chain 20, the central chain 22, and the planetary gears 14.

As it is shown in FIGS. 2 and 3, both chains are located in suitable seats 24 and 26, and consist of a roller or Galle's type chain. However, while the peripheral chain 20 remains stationary, the central chain 22 rotates on its axis and thereby drives the planetary gears 14.

The planetary gears 14 are provided each with a set of recesses 28 in which are lodged the elements to be lapped.

FIG. 4 schematically represents the entire machine according to the present invention.

A variable speed-motor 30 operates via the reduction unit 32 the hollow shaft 34 which is rigidly coupled to the disc 36 whose edge is provided with seat 26 (see FIG. 3) supporting the central chain 22 which is thus caused to rotate and in its turn making planetary gears 14 rotate.

To enable the lapping of thin and brittle materials, it is important to equip the machine with an adjustable speed-motor in such a way as to obtain a smooth start of the planetary gears in rotation. To this end, casing 38 is rigidly assembled to a supporting sleeve 40 which through an exterior screw thread couples also gear wheel 42 controlled by worm screw 44 linked with crank 46. When a vertical displacement of the annular lapping plates is required the crank 46 is manually operated: this causes an upward or downward (according to the direction of rotation of the crank) displacement of gear wheel 42. Inasmuch as supports 48 for the lower lapping plate 12 rest on and are affixed to said gear wheel 42, the lower lapping plate 12 will follow the displacements of the gear wheel 42.

Cylindrical support 50, on which cylindrical body 52 can tightly slide, is stiffly mounted on the base of the casing 38. Two conduits 54 and 56, communicating with the interior of the hollow support 50, constitute the inlet and outlet of a pressure oil circuit.

The device with supporting arms 58, which in turn support the upper lapping plate 10, rests on the head of cylindrical body 52. Consequently, the oil pressure inside the chamber of cylindrical body 52 balances the weight of the upper lapping plate 10.

The regulation of said oil pressure controls in turn the pressure developed by the upper lapping plate on the elements to be lapped. If the oil pressure is increased by a certain increment, cylindrical body 52 rises and consequently also the upper lapping plate 10 rises.

The abrasive suspension feeding system includes a reservoir 60 (see FIG. 9) which has toroidal construction and which rotates through the control given by motor 62 which transmits its rotation through sun gear 64 and planetary gears 66 to ring gear 68 rigidly coupled with inner wall 69 of the reservoir 60. Agitators 70 equipped with blades 72 are stationary and are fixed to the motor frame. The abrasive suspension flows downwardly through a hole 74 made in the reservoir wall and is governed by taper pin regulator 76.

The abrasive suspension falls onto chute 78 which rotates, being fixedly attached to the reservoir 60, and is thereupon distributed to a goove 80 machined on the upper lapping plate 10, from where it flows between the two lapping plates through a series of small ducts 82 (see also FIG. 3).

The simplicity of construction of the machine according to the present invention permits the use of large diameter annular lapping plates and consequently makes it possible to obtain a high output per machine, as the number of the elements to be lapped which can be simultaneously worked is directly proportional to the dimensions of the annular lapping plate.

After a certain length of operation, the originally flat surfaces of both annular lapping plates tend to acquire a slight conicity consequent to the different relative velocities had by the elements to be lapped in respect to said flat surfaces, this causing a greater wear towards that plate circumference where the relative velocities are higher. Consequently, a periodic levelling of the plates, becomes necessary and heretofore this has been generally carried out by machining or remachining the worn plates on a lathe.

With the lapping machine according to the present invention, however, the levelling of the worn lapping plates is accomplished through the periodic insertion of abrasive rings 84 (see FIGS. 5 and 6) which are placed between the plates of the lapping machine in place of the planetary gears 14. The lapping machine is then operated for some hours while feeding it with an abrasive suspension as though for the usual lapping operation. The abrasive ring 84 includes the ring gear 86, which is rotated by roller chain 22 and in its turn causes the abrasive ring 84 to rotate. The abrasive ring during rotation abrades and levels off the worn or tapered surface of annular plates 10 and 12. Ring gear 86 is adapted to slide on abrasive ring 84. This permits the automatic adjustment of the position of the abrasive ring in relation to any position of the plates towards chains 20 and 22.

Figure 7:
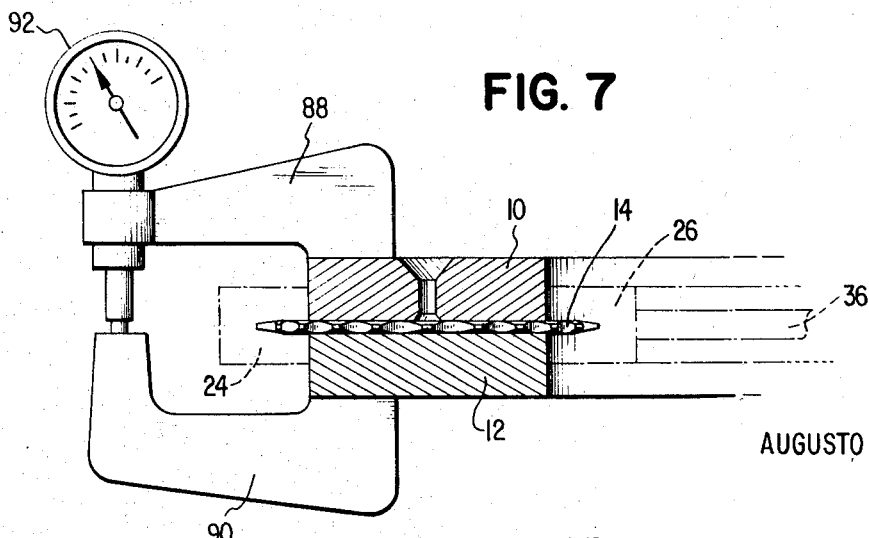
FIG. 7 shows a micrometer device for measuring the thickness of the elements being lapped.

The thickness of the elements being lapped is ascertained by a micrometer reading instrument equipped with the two metering arms 88 and 90 (FIG. 7), which, taking as its reference the comparative position of the lower lapping plate 12, continually points out the position of the upper plate in relation thereto by means of the dial or indicator 92, which can be of the conventional mechanical type or pneumatic or electronic type (not illustrated). The electronic type of indicator is the most suitable for the automatic control of the lapping machine whose stopping is induced by an appropriate contact or signal indicator 92 as soon as the desired predetermined thickness of the elements being lapped has been attained.

For the safe and convenient removal of the worked elements from the recesses 28 of the planetary gears 14, the lapping machine is equipped with a motor-driven vacuum pump (not illustrated) connected through flexible conduit 94 (FIG. 8) with a handle 96 which terminates in a rubber suction cup 98. By manually closing the vent 100 formed in the conduit extension, the sucker starts sucking and consequently lifts and draws off the finished lapped element 102 from the recess 28.

In addition to the much greater speed in the removal of the finished elements from the planetary gear dragging seats or recesses, this suction device assures also against the scoring or damaging of the delicate finish on the lapped surfaces as heretofore frequently happened when they were removed by ordinary manual means.

What is claimed is:

1. A machine for lapping elements obtained from crystalline materials, particularly semiconductor crystals, comprising two opposed stationary annular lapping plates, a plurality of planetary gears disposed between said plates, seat means located about the circumference of both the outer and inner edges of said annular lapping plates, roller chain means in each of said seat means engaging said planetary gears with the outer of said chain means being fixed, driving means drivingly connected to the inner of said chain means for transmitting rotational force to said planetary gears, and means to vary the relative spacing of said annular plates.

2. A machine according to claim 1 further comprising a substantially vertical rotatable first shaft, a horizontal disc fixedly mounted on said first shaft for rotation therewith and having said inner chain means connected thereto, and means for driving said first shaft and disc into rotation.

3. A machine according to claim 2 further comprising a framework for the machine, said outer annular seat being rigidly connected to said framework.

4. A machine according to claim 3 wherein said means for varying the relative spacing of said annular plates comprises an externally threaded sleeve coaxial with said first shaft and fixed to said framework, an internally screw threaded crown gear means mounted on said sleeve, a plurality of supporting arms means connecting said lower annular plate to said crown gear means, and manually operated worm screw means operatively connected to drive said crown gear means for lifting and lowering the lower lapping plate with respect to the upper lapping plate.

5. A machine according to claim 2 wherein said first shaft is hollow further comprising a second shaft coaxially mounted within said first shaft, a central support member mounted on said second shaft, a plurality of arm means supporting said upper lapping plate from said member, fluid actuator means operatively connected to vertically position said member on said second shaft thereby varying the relative spacing between said lapping plates.

6. A machine according to claim 5 further comprising a rotating distributor for an abrasive suspension, chute means on the arms supporting the upper plate for feeding the suspension to the plates.

7. A machine according to claim 1 further comprising a plurality of seats formed in each said planetary gear for receiving therein the elements to be lapped.

8. A lapping machine according to claim 1 further comprising means to extract the lapped elements from said planetary gears comprising suction means operatively mounted to be selectively positioned over said planetary gears and draw the lapped elements therefrom.

References Cited
UNITED STATES PATENTS

| | | | |
|---|---|---|---|
| 2,401,953 | 6/1946 | McCain | 51—161 |
| 3,063,206 | 11/1962 | Meyerhoff et al. | 51—161 |
| 3,151,421 | 10/1964 | Kremer | 51—161 |

OTHELL M. SIMPSON, Primary Examiner